United States Patent [19]
Schlafer et al.

[11] Patent Number: 5,253,250
[45] Date of Patent: Oct. 12, 1993

[54] ROUTING AND SWITCHING OF HIGH-SPEED OPTICAL DATA WITH THE HEADER TRANSMITTED ON A SUBCARRIER FREQUENCY

[75] Inventors: John Schlafer, Wayland; Elliot Eichen, Arlington; Robert Olshansky, Wayland, all of Mass.

[73] Assignee: GTE Laboratories Incorporated, Waltham, Mass.

[21] Appl. No.: 815,681

[22] Filed: Dec. 31, 1991

[51] Int. Cl.⁵ .......................................... H04L 12/56
[52] U.S. Cl. ................................. 370/60; 370/68.1; 370/94.1
[58] Field of Search ............ 370/60, 60.1, 94.1, 370/94.2, 94.3, 110.1, 68.1; 359/135, 136, 139, 140, 124, 115, 123, 116, 117

[56] References Cited

U.S. PATENT DOCUMENTS

| 4,939,721 | 7/1990 | De Bosio | 359/139 |
| 5,073,980 | 12/1991 | Prucnal et al. | 359/140 |

Primary Examiner—Wellington Chin
Attorney, Agent, or Firm—Lawrence E. Monks

[57] ABSTRACT

A method and apparatus is disclosed for signaling a switch of the target destination of a data packet having a header specifying the destination address and an information frame. The data packet along with a separate instance of the header is subcarrier multiplexed and simultaneously transmitted. The separate header is transmitted at a lower speed than the data packet permitting detection and processing by less expensive receivers.

11 Claims, 3 Drawing Sheets

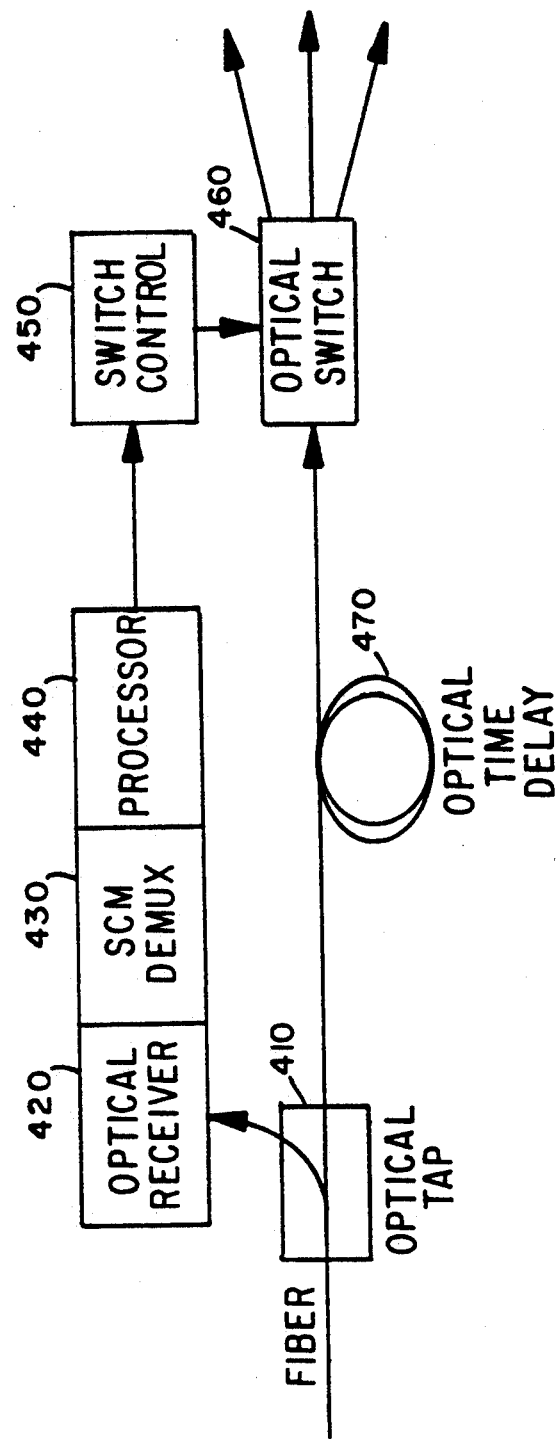

ROUTING AND SWITCHING OF HIGH-SPEED OPTICAL DATA WITH THE HEADER TRANSMITTED ON A SUBCARRIER FREQUENCY

FIELD OF THE INVENTION

The present invention relates generally to switching of data packets through a data communication or voice network and more particularly to the routing and switching of high speed optical datagram transmission with a control header transmitted on a subcarrier frequency.

BACKGROUND OF THE INVENTION

A conventional data packet frame or data packet is made up of a header and an information frame which are transmitted in sequence typically at identical communication rates. The header contains, among other things address information which is used to route the data packet through a series of switching nodes to its correct destination. At each node the packet is stored in memory and the target or final destination address is determined from the header. The switching node decodes the header, and switches the packet onto the proper communication link so as to proceed to its proper destination within the network.

In current fiber optic data packet networks switching of an optical data packet utilizes electrical rather than optical processing of the header. This in turn requires complete signal regeneration to be performed at each switching node at baseband. Tapping off a small portion of the optical signal and using this signal to extract the header information is precluded because the header and the information frame have the same data communication rate, and therefore the same optical power is required to detect the header as the information frame.

In an alternative approach, the header is transmitted at a slower rate as described in Ha, et al. "Demonstration of Photonic Fast Packet Switching at 700 Mb/s Data Rate", Electronics Letters, Vol. 27, pages 789–790 (1991). In this approach, a small portion of the optical signal can be tapped and used to process this optical header information. Since the optical signal power required to satisfy a predetermined maximum bit error rate increases non-linearly with an increasing data rate, less optical power is required to detect a slow header. Further, the integrated circuits that decode the header can operate at slower rates than the baseband information data rate and thus are less complex and less expensive to fabricate. However, there are disadvantages with this approach. This transmission format is incompatible with existing and emerging optical network standards such as SONET and FDDI. Furthermore, the existence of two data rates makes it difficult to optimize the detection bandwidth for the header and for the information data, and clock recovery is more complex. Moreover, since the header is transmitted at a slower rate, the overall throughput for the data packet is decreased, and the data transfer efficiency is lower.

OBJECTS OF THE INVENTION

It is an object of the present invention to obviate the disadvantages of the prior art.

It is a further object of the invention to permit the transmission of a header at a lower data rate than an information frame, thus requiring less expensive electronics for header processing.

It is a still further object of the invention to describe optical switching nodes and protocols that are compatible with optical transmission networks with optical connectivity between nodes.

It is a still further object of the invention to multiplex a data packet and a separate instance of a header according to the subcarrier multiplexing technique.

It is a still further object of the invention to prepare a switch for transmission prior to arrival of the data packet to be switched.

SUMMARY OF THE INVENTION

In the current invention, a method and apparatus is disclosed for signaling a switch of an arriving data packet containing an information frame and optionally a header for routing the data packet through the network. In another aspect of the invention, the data packet does not contain a header but relies on an independent header for routing information. The data packet and a separate instance of header information are simultaneously broadcast in the same time slot using subcarrier multiplexing (SCM) techniques. However, the header information on a separate subcarrier is transmitted at a substantially slower clock rate than the data packet on a different subcarrier. This approach retains the advantages of lower bandwidth electronics to process the header, and additionally allows for optimization of detection functionality for the header and the data packet. Conventional clock recovery techniques can be utilized since the header and the data packet are processed separately. Moreover, this approach is downward compatible with the emerging network standards that contain only a baseband signal channel.

Having detected the header information on the separate subcarrier, the data packet containing the information frame is delayed by an optical buffer for the time required for a switch to receive and act on the header information which is presented to it. Thus the switch is preconfigured to route the data packet correctly, upon immediate reception.

BRIEF DESCRIPTION OF THE DRAWINGS

FIG. 4 depicts apparatus for signaling a switch according to one embodiment of the instant invention.

DETAILED DESCRIPTION OF THE INVENTION

Figure 1:
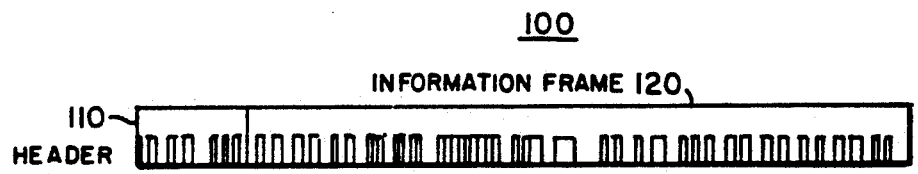
FIG. 1 is an illustration of a conventional data packet, having a header and an information frame.

For a better understanding of the present invention, together with other objects, advantages and capabilities thereof, reference is made to the following Description and appended claims, in conjunction with the drawings. FIG. 1 is an illustration of a conventional data packet 100 having a header 110 preceding an information frame 120. The header 110 is typically transmitted first and contains among other things, routing information that identifies the target destination for the data packet 100. In a data communication network having multiple end point destinations, a data packet may originate at one destination and be sent to any of the other end point destinations. In order to avoid a direct communication link between each end point destination, a bus structure is used to connect many nodes, and switches are used to read and remove messages from the bus.

Figure 2:
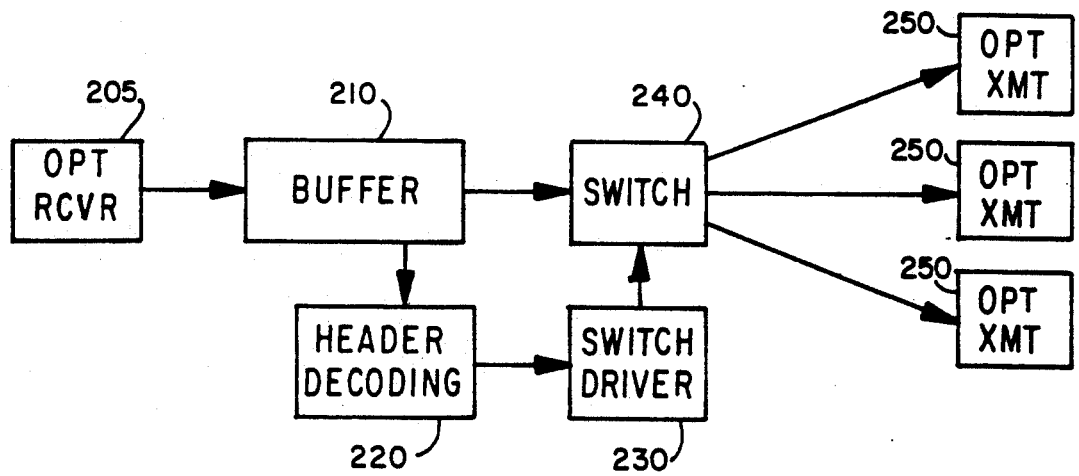
FIG. 2 depicts conventional apparatus for storing a data packet, decoding the header, and signaling a switch.

FIG. 2 depicts apparatus for conventional routing of a data packet. The data packet is received by optical receiver 205, and initially stored in a buffer 210 whereupon the header 110 is decoded by a decoding processor 220 and the next destination of the data packet is determined. The switch may direct the data packet to another switch within the network for further processing or transmit it to its target destination directly depending on the availability of data links between the switch and the target destination. Switch driver 230 reconfigures the switch 240 before the data packet 100 is transmitted by optical transmitter 250 to its next destination. In conventional data packet routing the data packet must be stored while the header is decoded and processed to determine the destination for the data packet and to reconfigure the switch to transmit that data packet.

Figure 3:
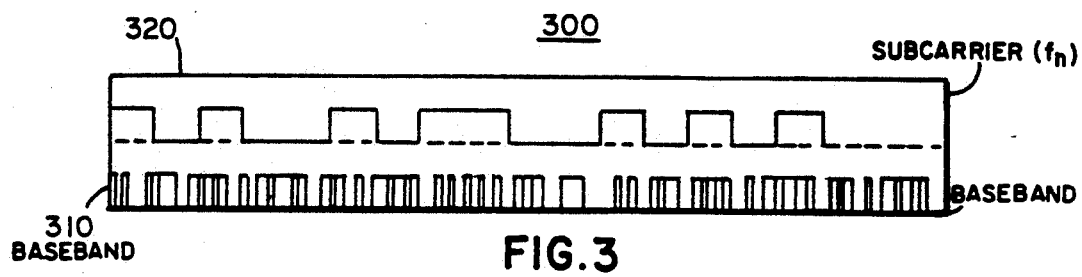
FIG. 3 depicts one embodiment of the instant invention wherein a separate instance of a header and a data packet are subcarrier multiplexed.

FIG. 3 illustrates one embodiment of the current invention. A data packet 310 is multiplexed with a separate header 320 and both are transmitted simultaneously. One of ordinary skill in the art will recognize that the data packet can either include or not include a header depending upon network protocol and system requirements (i.e. downward compatibility with all baseband network standards). The separate header for a given data packet may or may not be coincident with that data packet. The data packet 310 is transmitted on an optical carrier at baseband at data rate $D_b$, with b being the number of bits in the data packet. The separate header 320 is transmitted on the same optical carrier at a subcarrier frequency $f_h$ which is modulated using one of the conventional digital formats such as ASK, FSK, BPSK, or QPSK at rate $D_h$, with h being the number of bits in the header. In one embodiment of the invention $D_b$ is greater than $D_h$, and $D_b$ is preferably an integer multiple of $D_h$, technique used to multiplex the separate header and data packet is subcarrier multiplexing (SCM).

Referring now to FIG. 4, a multiplexed signal 300 is received at optical tap 410 and a portion of the signal is tapped off and sent to optical receiver 420. The data packet 310 is recovered by demultiplexing the tapped signal. The signal is demultiplexed into the separate header 320 and the data packet 310 by SCM demultiplexer 430. The separate header 320 is decoded by processor 440, and a signal is sent to switch control 450 to reconfigure the optical switch 460 prior to transmission of the data packet to the next destination. Transmission of the data packet 310 from the optical tap 410 is delayed by optical delay 470 to switch 460 for the amount of time necessary for the processor 440 and switch control 450 to decode the separate header and reconfigure switch 460 for the transmission of the data packet. The delay 470 in FIG. 4 is an extended length of fiber cable.

Figure 5:
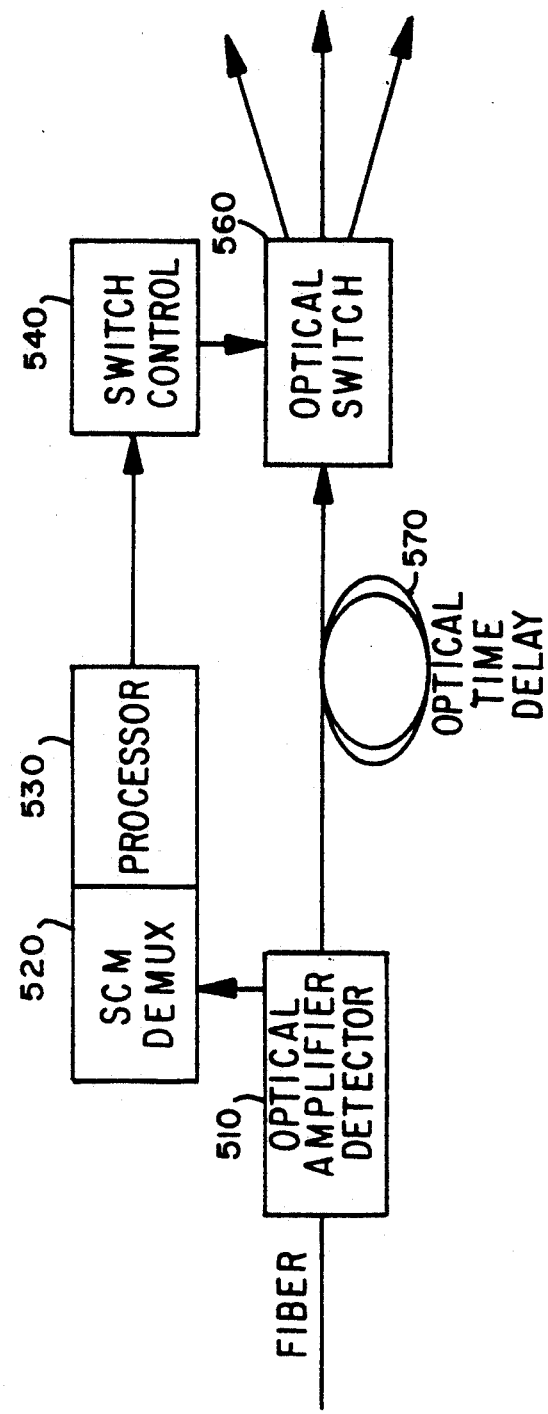
FIG. 5 depicts apparatus for signaling a switch according to another embodiment of the instant invention.

Referring now to FIG. 5 wherein another embodiment of the instant invention is illustrated. A multiplexed signal 300 is received at an optical amplifier/detector 510. Optical amplifier/detector 510 is a Semiconductor Laser Amplifier (SLA) that both amplifies and detects the incoming signal. The electrical signal from the detector portion of the SLA is received by SCM demultiplexer 520, and demultiplexed into the separate header 320 and the data packet 310. The separate header 310 is decoded by processor 530. Switch control 540 is signaled by processor 530, which informs switch 560 of the destination of the incoming data packet 310. Transmission of the data packet 310 from the optical amplifier/detector 510 is delayed by delay 570 for the amount of time necessary for the processor 530 and switch control 540 to decode the separate header 310 and reconfigure switch 560 for the transmission of the data packet. The delay 570 in FIG. 5 is an extended length of fiber cable.

In accordance with the instant invention, a separate instance of a header, containing address information for routing a data packet through a network, is transmitted at a lower data rate, having the advantage of using less expensive receivers for detecting the signal, and at the same time retaining a high data transmission rate for the data packet.

While there has been shown and described what are at present considered the preferred embodiments of the invention, it will be obvious to those skilled in the art that various changes and modifications can be made therein without departing from the scope of the invention as defined by the appended claims.

What is claimed is:

1. A method of signaling a switch for routing a data packet to the data packet's target destination, the data packet consisting of a header for specifying a target destination of the data packet and an information frame for holding data, the method comprising the steps of:
   a) receiving a multiplexed signal composed of a data packet signal and a separate header signal;
   b) tapping the received multiplexed signal and recovering the header signal;
   c) optically delaying the multiplexed signal composed of the data packet signal and the header signal;
   d) presenting a signal derived from the header to the switch;
   e) presenting the multiplexed data packet signal and header signal to the switch.

2. The method of signaling a switch in claim 1 wherein the multiplexed signal of step (a) is a subcarrier multiplexed signal.

3. The method of signaling a switch in claim 1 wherein the data packet signal is received at a first data rate and the header signal is received at a second data rate.

4. The method of signaling a switch in claim 3 wherein the second data rate is less than the first data rate.

5. The method of signaling a switch in claim 4 wherein the first data rate is an integer multiple of the second data rate.

6. The method signaling a switch in claim 5 wherein said data packet signal comprises a plurality of b bits said header signal comprises a plurality of h bits, and said integer multiple is greater than b/h.

7. The method of signaling a switch in claim 1 wherein the delay is a fixed delay.

8. The method of signaling a switch in claim 1 wherein the delay is a variable delay.

9. Apparatus for signaling a switch in preparation for routing a data packet to a target destination, the data packet consisting of a header for specifying a target destination of the data packet and an information frame for holding data, comprising:
   tap means for tapping a first multiplexed signal containing said data packet and also including a first separate instance of said header, and producing a second multiplexed signal containing said data packet and also including a second separate instance of said header:

switch receiving means for receiving said first multiplexed signal;

delay means for delaying said first multiplexed signal to produce a delayed first multiplexed signal;

demultiplexing means for demultiplexing said second multiplexed signal to recover said second separate instance of said header;

decoding means for decoding said target destination in said second separate instance of said header;

signaling means for notifying said switch of said target destination prior to reception by said switch receiving means of said delayed first multiplexed signal.

10. Apparatus for signaling a switch in claim 9 wherein the first and second multiplexed signals are subcarrier multiplexed signals.

11. A method of transmitting a data packet containing an information frame and a separate header specifying routing information for a data packet, the method comprising the steps of:

(a) transmitting the data packet at a first data rate;

(b) transmitting the header at a second data rate which is less than the first data rate;

(c) multiplexing the transmissions of steps (a) and (b) creating a multiplexed signal;

(d) transmitting the multiplexed signal.

* * * * *